Feb. 1, 1966    D. JOSEPHSON    3,232,571
METER BOX MOUNTING FOR BUILDING STRUCTURES
Filed May 25, 1964

INVENTOR.
DAVID JOSEPHSON
BY Cullen, Sloman & Cantor
ATTORNEYS

United States Patent Office 3,232,571
Patented Feb. 1, 1966

3,232,571
METER BOX MOUNTING FOR BUILDING
STRUCTURES
David Josephson, Redford Township, Mich.
(25116 Grand River, Detroit 40, Mich.)
Filed May 25, 1964, Ser. No. 369,843
3 Claims. (Cl. 248—201)

This invention relates to a meter box mounting for building structures.

When building structures have been started and the siding has not as yet been applied to the studs or other supporting structure, it is often necessary to have electrical power to the building site and for this purpose various means have been devised for mounting a meter box under such conditions as will be acceptable to the electrical companies.

It is the object of the present invention to provide a novel form of meter box mounting for a building structure by which a temporary and rigid mount is provided before the siding has been applied to the studding.

It is another object to provide for sufficient clearance to permit application of the siding to the studding; after which the meter box may be drawn up tightly against the siding.

It is another object to provide a simple mounting in the form of a pair of slotted mounting plates to which the meter box may be bolted and held in a rigid upright position and spaced outwardly from the building studding.

These and other objects will be seen from the following specification and claims in conjunction with the appended drawing in which:

Figure 1:
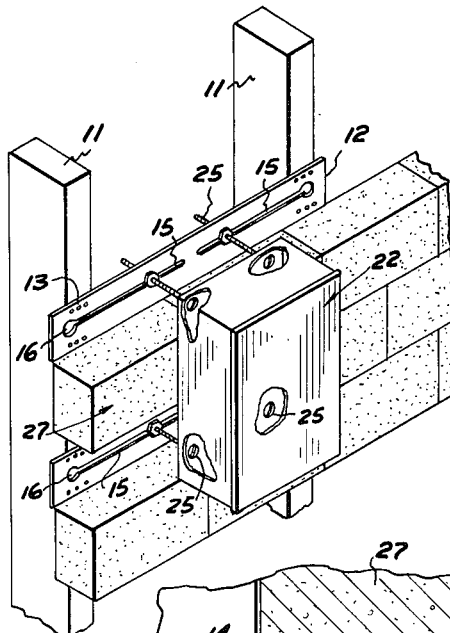
FIG. 1 is a fragmentary front perspective view of a meter box mounting for a building structure spaced forwardly of the studding with the siding partly in place.
Figure 2:
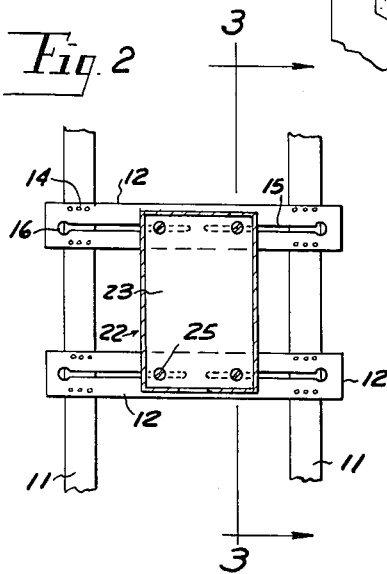
FIG. 2 is a front elevational view of the mounting of the meter box mounting before the siding has been applied.

It will be understood that the above drawing illustrates merely a preferred embodiment of the invention and that other embodiments are contemplated within the scope of the claims hereafter set forth.

Referring to the drawing, and as reasonably conventional with building structures there are provided pairs of upright studs 11, normally 2" x 4" in character, and having a spacing of 18" to 24" for illustration. The present mounting includes a pair of horizontally disposed vertically spaced parallel mounting plates 12 which are apertured transversely adjacent their ends for securing as at 14, FIG. 3, to a pair of adjacent upright studs 11.

The plates 12 each have a pair of horizontally disposed aligned elongated slots 15 which at their one ends terminate in the enlarged apertures 16 adapted to receive the enlarged shanks 18 of securing nuts 17.

Each of said nuts has intermediate its head and shank 18 an annular groove 19 or slotted portion adapted to cooperatively nest and interlock with the elongated slotted portions of plates 12, by which said nuts are slidably mounted and retained upon said plates.

The nuts once adjusted on plates 12, corresponding to the spacing of the apertures in the meter box rear wall 23, may be secured in place by tightening lock nuts 20. Said lock nuts are mounted upon threaded shanks 18 of nuts 17 and operatively engage the rear surfaces of plates 12, FIG. 3.

Each of the nuts 17 has a longitudinal central interiorly threaded bore 21 adapted to receive the mounting bolts 25. These project rearwardly through apertures in the spaced depressed portions 24 in rear wall 23 of the meter box.

In the initial assembly before siding 27 has been applied to studs 11, the meter box is supported in an upright position spaced forwardly of said studs. Bolts 25 are projected rearwardly through the apertures in rear wall 23 of the meter box and are held rigidly with respect to said rear wall.

For this purpose, with the heads of bolts 25 engaging the interior surface of the rear wall, suitable "Tinnerman" nuts or other friction locking means are manually projected over said bolts into operative engagement with rear wall 23 upon its exterior.

This secures the meter box with respect to the headed ends of said bolts against relative longitudinal movement thereon. Thereafter, and depending upon the lateral spacing of said bolts, nuts 17 are longitudinally adjusted upon plates 12 and the bolts are threaded through said nuts, FIG. 3. At that time the lock nuts 20 are tightened against plates 12 to provide a temporary but rigid supporting structure for the meter box.

Thereafter, and as required, siding 27 is applied to the exterior of supports 11, FIG. 1, and inwardly of the rear wall of the meter box. This siding may be bricks, wood or other siding. After the siding has been completed, bolts 25 are further tightened relative to nuts 17, so that the meter box is drawn up snugly against the siding, FIG. 3. This completes the assembly and mounting of the meter box to the building structure.

Since meter boxes come in different sizes and since the apertures in the rear walls thereof for mounting are at different center distances, it is desirable that the securing nuts 17 be capable of lateral sliding adjustment. This is accomplished through the use of slots 15 in mounting plates 12.

Figure 3:
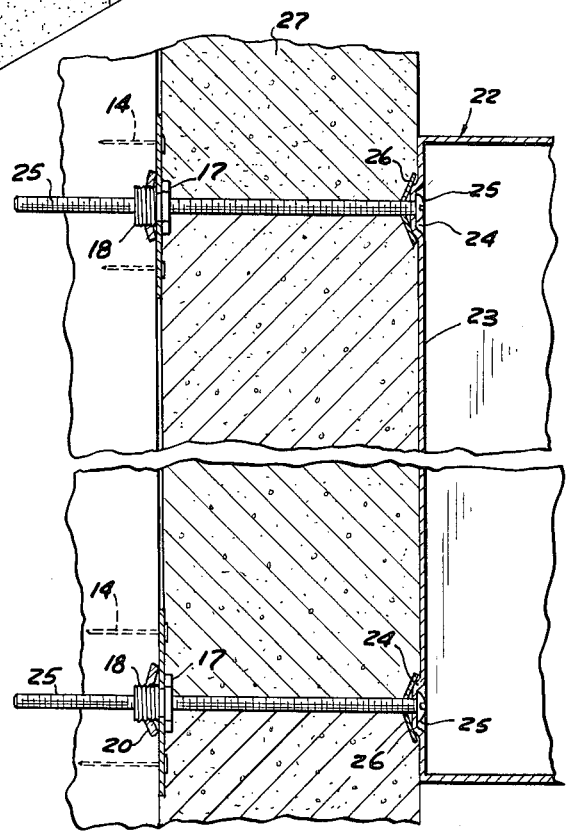
FIG. 3 is a fragmentary section on an increased scale taken in the direction of arrows 3—3 of FIG. 2, with the siding in place and the meter box registering with the siding.
Figure 5:
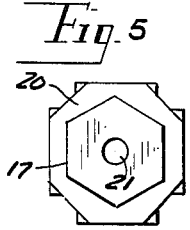
FIG. 5 is an end elevational view thereof.
Figure 4:
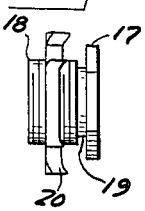
FIG. 4 is a side elevational view of the meter box securing nut and lock nut.

Since the friction securing means 26, FIG. 3, operatively bear against the outer surface of the meter box rear wall and the bolt heads operatively engaging the interior surface thereof, even without the siding in place the meter box is suspended by a four point support. This support is substantially rigid with respect to the studs, in a manner approved by most electrical companies. With this type of temporary mounting of the meter box electrical power may be brought thereto for use upon the job site.

When the siding is completed, all that is necessary is to tighten up bolts 25 drawing the meter box into snug engagement with said siding as in FIG. 3.

Having described my invention, reference should now be had to the following claims.

I claim:
1. Means for mounting a meter box having a rear wall upon a pair of parallel spaced supports of a building structure:
  the improvement comprising a pair of parallel spaced mounting plates for respectively spanning, extending at right angles to and adapted to be secured to said supports, each plate having a longitudinal slot therein;
  a pair of spaced nuts projecting through said slots and slidably mounted upon each plate;
  a plurality of elongated bolts extending through and anchored against said rear wall and projecting rearwardly thereof; and
  retainer means frictionally mounted over said bolts and operatively engaging said rear wall adapted for securing said meter box against movement longitudinally of said bolts;

the ends of said bolts being threaded into said nuts for mounting and spacing the meter box forwardly of said supports.

2. Means for mounting a meter box having a rear wall upon a pair of spaced upright studs of a building structure; the improvement comprising:

a pair of horizontally disposed vertically spaced parallel mounting plates for respectively spanning and adjacent their ends adapted to be secured to said studs; each plate having a longitudinal slot therein;

a pair of spaced nuts projecting through said slot and slidably mounted upon each plate;

a plurality of elongated bolts extending through and anchored against said rear wall and projecting rearwardly thereof;

retaining means frictionally mounted over said bolts and operatively engaging said rear wall securing said meter box against movement longitudinally relative to said bolts;

the ends of said bolts threaded into said nuts for mounting and spacing the meter box forwardly of said studs.

3. In the meter box mounting of claim 2, said slot including an enlarged opening, each nut having an enlarged head and a threaded shank of greater diameter than the width of said slot and projected through said enlarged opening, there being a slotted portion intermediate said head and shank slidably or adjustably nested in said slot; and a lock nut threaded over said shank and operatively engaging said plate.

References Cited by the Examiner

UNITED STATES PATENTS

| | | | |
|---|---|---|---|
| 1,005,499 | 10/1911 | Baker | 248—201 |
| 1,156,885 | 10/1915 | Caine | 248—221 |
| 2,734,126 | 2/1956 | Kruger | 240—9 |

CLAUDE A. LE ROY, *Primary Examiner.*